United States Patent [19]

Sugimura et al.

[11] Patent Number: 5,013,464

[45] Date of Patent: May 7, 1991

[54] LIQUID SUSPENSION COMPOSITION CONTAINING GALLIUM PARTICLES AND PROCESS FOR PRODUCING THE SAME

[75] Inventors: Kentaro Sugimura, Chiba; Shoji Hasimoto, Kosakamachi; Takayuki Ono, Sendai, all of Japan

[73] Assignee: Dowa Mining Co., Ltd., Tokyo, Japan

[21] Appl. No.: 464,523

[22] Filed: Jan. 12, 1990

[30] Foreign Application Priority Data

Apr. 28, 1989 [JP] Japan ................................. 1-107405
Jul. 8, 1989 [JP] Japan ................................. 1-176792

[51] Int. Cl.$^5$ .......................................... C10M 125/04
[52] U.S. Cl. ....................................... 252/26; 44/321; 252/49.3; 252/52 R
[58] Field of Search .................... 252/26, 49.3; 44/321

[56] References Cited

U.S. PATENT DOCUMENTS

| | | | |
|---|---|---|---|
| 3,391,080 | 7/1968 | Buckley et al. | 252/26 |
| 3,405,063 | 10/1968 | Boes et al. | 252/12 |
| 4,076,637 | 2/1978 | Hurst | 252/26 |
| 4,490,264 | 12/1984 | Gerkema et al. | 252/12 |
| 4,647,386 | 3/1987 | Jamison | 252/25 |
| 4,673,597 | 6/1987 | Hashimoto | 427/374.4 |

*Primary Examiner*—Prince E. Willis
*Assistant Examiner*—Ellen M. McAvoy
*Attorney, Agent, or Firm*—Frishauf, Holtz, Goodman & Woodward

[57] ABSTRACT

Fine particles of gallium or gallium alloy that are covered with a coating agent on the surface can be dispersed in a solvent such as an engine oil, n-hexane, etc., to make a variety of useful liquid suspensions which include a modified automotive engine oil, which is superior to a commercial engine oil; a liquid ski wax which is portable in a cylindrical container; and the like.

22 Claims, No Drawings

LIQUID SUSPENSION COMPOSITION CONTAINING GALLIUM PARTICLES AND PROCESS FOR PRODUCING THE SAME

BACKGROUND OF THE INVENTION

1. Field of the Invention

The present invention relates to a liquid suspension composition having a novel form of gallium particles suspended in a solvent. The present invention also relates to a process for producing said composition and uses thereof.

2. Background Information

Covering the surface of metal particles such as copper, zinc, lead, iron and $MoS_2$ with coating agents is one of the well known techniques of modifying the properties of metals. It is also known that such coated fine metallic particles can be formulated in pastes, used as lubricants or find various other uses. Japanese Patent Public Disclosure No. 58-125796 entitled "Solid Lubricant" shows a solid lubricant comprising wax and at least one additive selected from the group consisting of molybdenum disulfide, tungsten disulfide, boron nitride and graphite. The present inventors previously filed a patent application entitled "Ski Wax" (later published under Japanese Patent Publication No. 62-8460) which proposes that a lubricant composition containing metallic gallium either independently or alloyed with at least one metal selected from the group consisting of In, Zn, Sn, Al, etc. be used as a ski wax. Commercially available ski waxes include all-purpose waxes (commonly referred to as "silver paraffin wax") and waxes for competition, and they are all based on paraffin wax. Another use of metallic gallium is as a solid lubricant as disclosed in U.S. Pat. Nos. 3,405,063 and 3,391,080.

As shown above, all of the conventional uses of gallium or gallium alloys are based on gallium in the metallic state. The melting point of gallium is extremely low (29.78° C.) and unlike other metals, it cannot be reduced to particles at elevated temperatures, so the scope of applications in which it can be used has been very limited.

The present inventors successfully established a technique by which metallic gallium or gallium alloy that was previously held difficult to reduce to a particulate form could be processed to fine particles not larger than 150 μm (microns), and even to finer particles not larger than 50 μm (microns). With a view to finding some use of these fine gallium particles, the present inventors conducted extensive studies on a method of using them in suspension. However, in all cases attempted, gallium particles simply settled on the bottom of liquid media instead of being suspended therein.

In order to overcome this problem, the present inventors continued their efforts and finally found that metallic gallium particles which would otherwise simply settle on the bottom of suspension media could successfully be suspended in the media when the surface of particles of a size not greater than 150 μm (microns) or even finer particles of a size of 50 μm (microns) and below was covered with a certain kind of coating agent. The present invention has been accomplished on the basis of this finding.

The process for producing fine metallic gallium or gallium alloy particles which can be used in the present invention is disclosed in the co-pending Japanese Patent Application No. 1-104996/1989, mentioned above.

The process comprises the steps of melting metallic gallium or gallium alloy in an atmosphere of inert gas such as nitrogen or argon at a temperature higher than the melting point of gallium or gallium alloy to be melted, but not higher than 100° C., preferably at a temperature in the range of 70°-90° C. and atomizing the molten metal through a nozzle into a cooling medium which can be a plain water or an aqueous solution of at least one compound selected from the group consisting of alcohols, oleic acid and salts thereof, such as sodium oleate and coating agents such as a surfactant, keeping the cooling medium at a temperature not higher than 10° C., preferably not higher than 5° C., said cooling medium being placed in open air or in a sealed tank which is kept under an inert gas atmosphere. The pressure of inert gas for atomizing the molten metal from the nozzle is preferably in the region of 5-10 kg/cm$^2$ when nitrogen is used for that purpose. Proper inert gas pressure can be determined depending on the desired particle size of the product fine particles. More detailed information can be found in the co-pending Japanese Patent Application No. 1-104996, mentioned above.

SUMMARY OF THE INVENTION

An object, therefore, of the present invention is to provide a liquid suspension composition comprising gallium particles that are covered with a coating agent on the surface and that are suspended in a solvent.

Another object of the present invention is to provide a process for producing such a liquid suspension by first mixing a molten lubricant with gallium particles and then suspending the mixture in an organic solvent.

A further object of the present invention is to provide novel uses of said liquid suspension.

DETAILED DESCRIPTION OF THE INVENTION

It has been found by the present inventors that gallium particles to be used in the present invention preferably have a size not greater than 150 μm (microns), more preferably not greater than 50 μm (microns), in order for them to be uniformly mixed with liquid media. The present inventors also found that such gallium particles are preferably mixed in amounts of at least 0.005 parts (all parts to be designated hereinafter are based on weight) with 100 parts of medium. The amount of gallium particles to be used may vary depending upon their specific use, as long as they can be suspended in liquid media, but in consideration of materials cost, using not more than 5 parts of gallium particles per 100 parts of medium is economical and it was established by experiment that using such small amounts of gallium particles were sufficient to give reasonable results in most applications.

Gallium particles which can be used in the practice of the present invention include those of metallic gallium either independently or alloyed with at least one metal selected from the group consisting of In, Zn, Sn, Al, etc. It has been observed that when gallium alloy is used, the greater the content of gallium, the better lubricating properties of the composition containing particles of that alloy. Thus, it has been confirmed that gallium shows sufficient lubricating properties even when it is alloyed with the other metal or metals.

Coating agents for covering the surface of gallium particles include lubricants such as waxes, coupling agents, polymerizable monomers, etc.

Preferred examples of lubricants include paraffin wax and a solid lubricant having a wax mixed with at least one additive selected from the group consisting of molybdenum disulfide, tungsten disulfide, boron nitride and graphite.

Coupling agents are those compounds which have in their molecule an organic functional group having affinity for organic materials and a hydrolyzable group having affinity for inorganic materials and which are capable of chemically coupling organic and inorganic materials. Representative of such coupling agents are silane coupling agents. Silane coupling agents are, of course, used preferably in the present invention, but it should be noted that any other coupling agents may also be used effectively. Illustrative polymerizable monomers that can be used in the present invention include methyl methacrylate, ethyl acrylate, acrylonitrile, vinyl acetate and styrene. The amount in which they are used is not limited to any particular value but desirably, they are used in amounts not exceeding 50 wt % of the gallium particles used.

Other coating agents may of course be employed and they include propylene polymers such as polypropylene and polypropylene oxide, as well as atactic polymers (isotactic polymers) and ethylene oxide polymers.

The coated gallium particles are then dispersed in liquid media as illustrated by alcohols (methyl alcohol and ethyl alcohol), oils, lube oils, lubricants and aqueous solutions. An optimum medium may be selected in accordance with the contemplated use of the resulting liquid suspension composition.

The following examples are provided for the purpose of further illustrating the present invention but are in no way to be taken as limiting.

EXAMPLE 1

Metallic gallium was melted by heating and injected into chilling water. The resulting particles were sifted and those finer than 250 μm (microns) were pulverized to a size of 37 μm (microns) and below on a vibrating mill. By sieving, fine gallium particles having a desired size distribution were obtained. The resulting fine particles of gallium (average size, 5 μm (microns)) were mixed with a coating agent under agitation and then added to a solvent engine oil so as to prepare a liquid suspension of gallium particles.

This suspension was used as an automotive engine oil and the consumption of gasoline was about 15% smaller than when a commercial engine oil was used.

Tests were repeated in the same manner as given above except that particles of gallium alloy having a composition of Ga-5Zn, Ga-15Zn, Ga-40In, Ga-5Al or Ga-15Al was used, respectively, instead of particles of metallic gallium alone. In each run similar advantageous result was obtained.

EXAMPLE 2

A given amount of paraffin wax was melted by heating. To this wax, a suspension of gallium particles (average size, 5 μm (microns)) in ethyl alcohol was added and the mixture was stirred to evaporate the ethyl alcohol. The resulting mixture was added to an organic solvent (n-hexane) and the solution was cooled under agitation for 30 min. to make a gallium particle containing suspension composition. This suspension was portable in a cylindrical container and proved to be very effective as a liquid ski wax.

Tests were repeated in the same manner as given above except that particles of gallium alloy having a composition of Ga-5Zn, Ga-15Zn, Ga-40In, Ga-5Al or Ga-15Al was used, respectively, instead of particles of metallic gallium alone. In each run a similar suspension effective as a liquid ski wax was obtained.

EXAMPLE 3

To a given amount of molten paraffin, a coating agent dissolved in n-hexane was added and the n-hexane was evaporated from the solution. Subsequently, a suspension of gallium particles (average size, 3 μm (microns)) in ethyl alcohol was added and the mixture was stirred to evaporate the ethyl alcohol. The resulting gallium particle containing mixture was dispersed in n-hexane and the liquid dispersion was cooled under agitation for 30 min. to make a liquid suspension composition containing gallium particles.

This liquid composition was charged into a cylindrical container, which was also filled with LP gas with the composition to LP gas ratio being 4:6.

The container was designed as a sprayer except that the spout was fitted with a circular sponge of the same diameter as that of the container, so that the wax as sprayed could be immediately spread uniformly on the surface of a ski. This sprayable wax proved to be very effective in waxing skis, lubricating sliding doors, fusuma or doorsills, or activating other construction materials, as well as gallium particle containing resin compositions.

In each of the examples described above, the content of gallium particles was adjusted to be 0.5 wt % of the total composition.

Tests were repeated in the same manner as given above except that particles of gallium alloy having a composition of Ga-5Zn, Ga-15Zn, Ga-40In, Ga-5Al or Ga-15Al was used, respectively, instead of particles of metallic gallium alone. In each run similar advantageous result was obtained.

EXAMPLE 4

To examine the advantage of adding gallium particles to gasoline, engine tests were carried out under conditions set forth in Table 1 by using 300 dynamo. In the table, "time required for consuming gasoline" means the time from the starting of engine after oil supply to the stop of engine.

TABLE 1

| | Regular Oil 200 ml | Regular Oil + Gallium Particle (0.25%) 200 ml | Index determined based on Ga-particle free oil (=100) |
|---|---|---|---|
| Test 1 (Testing Date: 22/4/1989; Temperature 18° C. ± 1° C.) | | | |
| Gasoline | 50 ml | 50 ml | |
| Time required for Consuming gas (Run 1) | 7'44" (7.73') | 8'45" (8.75') | 113.2% |
| Time required for Consuming gas (Run 2) | 7'58" (7.97') | 8'50" (8.83') | 110.8% |

TABLE 1-continued

|  | Regular Oil<br>200 ml | Regular Oil + Gallium<br>Particle (0.25%) 200 ml | Index determined based on<br>Ga-particle free oil (=100) |
|---|---|---|---|
| Average in Test 1 | 7'51" (7.85') | 8'48" (8.80') | 112.1% |
| Oil Temperature | 97° C. | 90° C. |  |
| Test 2 (Testing Date: 24/4/1989; Temperature: 8° C. ± 1° C.) | | | |
| Gasoline | 100 ml | 100 ml |  |
| Time required for Consuming gas (Run 1) | 11'54" (11.90') | 13'22" (13.37') | 112.4% |
| Time required for Consuming gas (Run 2) | 11'56" (11.93') | 12'42" (12.70') | 106.5% |
| Time required for Consuming gas (Run 3) | 11'43" (11.72') | 12'30" (12.50') | 106.7% |
| Time required for Consuming gas (Run 4) | 11'56" (11.93') | 12'18" (12.30') | 103.1% |
| Time required for Consuming gas (Run 5) | 11'49" (11.82') | 12'20" (12.33') | 104.3% |
| Time required for Consuming gas (Run 6) | 11'12" (11.20') | 12'29" (12.48') | 111.4% |
| Average in Test 2 | 11'45" (11.75') | 12'37" (12.62') | 107.4% |
| Oil Temperature | 79° C. | 75° C. |  |

As is shown in the above table in both tests time required for consuming the same amount of gasoline was extended by 7-12% in average in the case when gallium particles were added. This clearly shows that gas consumption was improved by the addition of gallium particles. It is also obvious from Table 1 that the advantage of reducing oil temperature is brought about by the addition of gallium particles.

Tests were repeated in the same manner as given above except that particles of gallium alloy having a composition of Ga-5Zn, Ga-15Zn, Ga-40In, Ga-5Al or Ga-15Al was used, respectively, instead of particles of metallic gallium alone. In each run similar advantageous result was obtained.

EXAMPLE 5

A suspension of gallium particles (average size, 5 μm (microns)) in ethyl alcohol was stirred to evaporate the ethyl alcohol. The resulting mixture was added to an organic solvent (n-hexane) and the solution was cooled under agitation for 30 min. to make a gallium particle containing lubricant. This lubricant was portable in a cylindrical container and proved to be very effective as a liquid lubricant.

Tests were repeated in the same manner as given above except that particles of gallium alloy having a composition of Ga-5Zn, Ga-15Zn, Ga-40In, Ga-5Al or Ga-15Al was used, respectively, instead of particles of metallic gallium alone. In each run similar advantageous result was obtained.

As shown in the above Examples 1 through 5 gallium particles which can be used in the present invention include particles of gallium alloys having compositions of Ga-5Zn, Ga-15Zn, Ga-40In, Ga-5Al or Ga-15Al etc. as well as particles of metallic gallium alone. It has been confirmed that almost equal satisfactory result can be obtained by using particles of gallium alloys instead of using particles of metallic gallium. The reason for this has not been fully clarified yet. Probably, characteristic properties of gallium inclusive of excellent lubricity, wear resistance and sliding properties, etc. can be fully displayed even in the form of alloy particles because the size of particles is extremely small.

As described on the foregoing pages, the liquid suspension composition of the present invention is an article of use the manufacture of which became possible only after the establishment of a technique of producing very fine gallium particles. The present invention is capable of offering various new products that make the most of the lubricating characteristics of gallium particles. Accordingly, the present invention has an extremely high commercial value. Stated in other words, the gallium particle containing liquid suspension composition of the present invention may be utilized in a broad range of applications including engine oils, ski waxes, either in a liquid or spray form, etc. by merely changing the suspension medium to be used.

What is claimed is:

1. A liquid suspension composition comprising 0.005-5 parts by weight of gallium or gallium alloy particles having a size not greater than 150 μm suspended in 100 parts by weight of a liquid medium, said gallium or gallium alloy particles being covered on the surface thereof with a coating agent selected from the group consisting of waxes, coupling agents and polymerizable monomers.

2. The liquid suspension composition according to claim 1 wherein said particles are those having a size of not greater than 50 μm.

3. The liquid suspension composition according to claim 1 wherein said gallium alloy being an alloy of Ga and at least one metal selected from the group consisting of In, Zn, Sn and Al.

4. The liquid suspension composition according to claim 3 wherein said gallium alloy is an alloy having the composition of Ga-5% (by weight) Zn, Ga-15% (by weight) Zn, Ga-40% (by weight) In, Ga-5% (by weight) Al or Ga-15% (by weight) Al.

5. The liquid suspension composition according to either of claims 3 or 4 wherein said particles are those having a size of not greater than 50 μm.

6. The liquid suspension composition according to claim 1, wherein said liquid medium is selected from the group consisting of alcohols, non-lubricating oils, lubricants and aqueous solutions.

7. The liquid suspension composition according to claim 1, wherein said liquid medium is lube oil.

8. The liquid suspension composition according to claim 6, wherein said particles have a size of not greater than 50 μm.

9. The liquid suspension composition according to claim 1, wherein the coating agent is selected from the group consisting of paraffin wax, silane coupling agents, methyl methacrylate, ethyl acrylate, acrylonitrile, vinyl acetate, styrene polypropylene, polypropylene oxide, atactic polymers and ethylene oxide polymers.

10. The liquid suspension composition according to claim 9, wherein the coating agent is in an amount not exceeding 50 weight % of the particles.

11. The liquid suspension composition according to claim 10, wherein the liquid medium is selected from the group consisting of an alcohol, an non-lubricating oil, a lubricant and an aqueous solution.

12. The liquid suspension composition according to claim 11, wherein the alcohol is selected from the group consisting of methyl alcohol and ethyl alcohol.

13. The liquid suspension composition according to claim 10, wherein the liquid medium is a lube oil.

14. A process for producing a liquid suspension composition containing gallium or gallium alloy particles, said process comprising the steps of preparing gallium or gallium alloy particles to have a size of not greater than 150 $\mu$m, mixing said gallium or gallium alloy particles with a molten lubricant to obtain particles coated on the surface thereof with the lubricant and dispersing 0.005-5 parts by weight of the coated gallium or gallium alloy particles in 100 parts by weight of a liquid suspending medium, said gallium alloy being selected from the group consisting of Ga-5Zn, Ga-15Zn, Ga-40In, Ga-5Al and Ga-15Al.

15. The process according to claim 14, wherein said liquid suspending medium is selected from the group consisting of an engine oil, gasoline and n-hexane and wherein said lubricant is selected from the group consisting of waxes, coupling agents and polymerizable monomers.

16. The process according to claim 10, wherein said particles have a size of not greater than 50 $\mu$m.

17. A process for producing a liquid suspension composition containing gallium or gallium alloy particles, said process comprising the steps of melting metallic gallium or a gallium alloy in an atmosphere of inert gas at a temperature higher than the melting point of the gallium or gallium alloy to be melted, but not higher than 100° C., atomizing the molten metal through a nozzle into a cooling medium, maintaining the cooling medium at a temperature not higher than 10° C. to obtain gallium or gallium alloy particles having a size of not greater than 150 $\mu$m, mixing the resulting particles with a molten lubricant to obtain particles coated on the surface thereof with the lubricant and dispersing 0.005-5 parts by weight of the coated gallium or gallium alloy particles in 100 parts by weight of a liquid suspending medium, said gallium alloy being selected from the group consisting of Ga-5Zn, Ga-15Zn, Ga-40In, Ga-5Al and Ga-15Al.

18. A process according to claim 17, wherein said melting of gallium or gallium alloy is conducted at a temperature of 70° to 90° C. in an atmosphere of nitrogen or argon, said cooling is conducted in water or in an aqueous solution of at least one compound selected from the group consisting of alcohols, oleic acid, a salt of oleic acid and surfactants, and conducting said cooling at a temperature not higher than 5° C.

19. An engine oil composition comprising a liquid suspension which comprises 0.005-5 parts by weight of metallic gallium or gallium alloy particles having a size of not greater than 150 $\mu$m suspended in 100 parts by weight of an engine oil as a liquid suspending medium, said gallium or gallium alloy particles being covered on the surface thereof with a coating agent selected from the group consisting of waxes, coupling agents and polymerizable monomers, said alloy being selected from the group consisting of Ga-5Zn, Ga-15Zn, Ga-40In, Ga-5Al and Ga-15Al.

20. A gasoline composition comprising a liquid suspension which comprises 0.005-5 parts by weight of metallic gallium or gallium alloy particles having a size of not greater than 150 $\mu$m suspended in 100 parts by weight of gasoline as a suspending medium, said gallium or gallium alloy particles being covered on the surface thereof with a coating agent selected from the group consisting of waxes, coupling agents and polymerizable monomers, said alloy being selected from the group consisting of Ga-5Zn, Ga-15Zn, Ga-40In, Ga-5Al and Ga-15Al.

21. In a ski wax composition comprising a liquid suspension which comprises 0.005-5 parts by weight of metallic gallium or gallium alloy particles having a size of not greater than 150 $\mu$m suspended in 100 parts by weight of n-hexane as a liquid suspending medium, said gallium or gallium alloy particles being covered on the surface thereof with a coating agent selected from the group consisting of waxes, coupling agents and polymerizable monomers, said alloy being selected from the group consisting of Ga-5Zn, Ga-15Zn, Ga-40In, Ga-5Al and Ga-15Al.

22. A liquid lubricant composition comprising a liquid suspension which comprises 0.005-5 parts by weight of metallic gallium or gallium alloy particles having a size of not greater than 150 $\mu$m suspended in 100 parts by weight of n-hexane as a liquid suspending medium, said gallium or gallium alloy particles being covered on the surface thereof with a coating agent selected from the group consisting of waxes, coupling agents and polymerizable monomers, said alloy being selected from the group consisting of Ga-5Zn, Ga-15Zn, Ga-40In, Ga-5Al and Ga-15Al.

* * * * *